United States Patent [19]

Montuori

[11] 4,357,694
[45] Nov. 2, 1982

[54] THERMALLY RESPONSIVE BIMETALLIC JEWELRY

[76] Inventor: Carl F. Montuori, 7107 Ridgewood Ave., Chevy Chase, Md. 20015

[21] Appl. No.: 274,802

[22] Filed: Jun. 18, 1981

[51] Int. Cl.³ .................... A44C 5/02; A44C 5/12; A44C 9/00
[52] U.S. Cl. .................................. 368/282; 63/3; 63/4; 63/11; 63/15.5; 59/82; 224/175; 428/616; 428/595
[58] Field of Search ............. 63/3, 11, 4, 15, 15.45, 63/15.5, 15.7; 428/544, 616, 617, 618, 619; 224/175, 178, 179; 368/282; 59/82

[56] References Cited

U.S. PATENT DOCUMENTS

| 2,035,562 | 3/1936 | Minister | 63/15 |
| 2,133,918 | 10/1938 | Eccles | 63/15 X |
| 2,144,915 | 1/1939 | Derby | 428/616 X |
| 2,377,222 | 5/1945 | Fruth | 63/27 X |
| 3,540,109 | 11/1970 | Marthaler | 63/11 X |

Primary Examiner—F. Barry Shay
Attorney, Agent, or Firm—Low & Low

[57] ABSTRACT

Thermally expansive jewelry as bracelets, rings, wristwatch bands and the like are characterized by formation of the entirety or a component part thereof of an arcuate length of bimetallic strip, thereby to increase and decrease the effective diameter or bounded area of the jewelry to maintain comfort and fit of the jewelry as the body member such as a wrist or finger may swell or recede under varying temperature conditions.

10 Claims, 6 Drawing Figures

Fig. 1
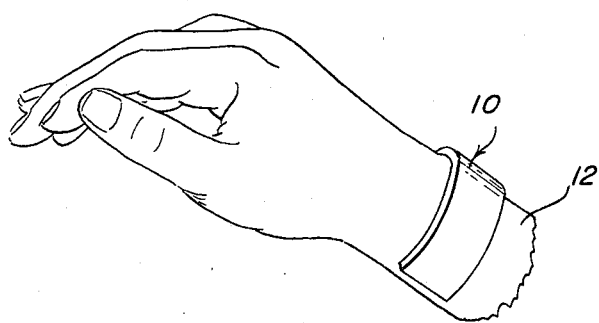
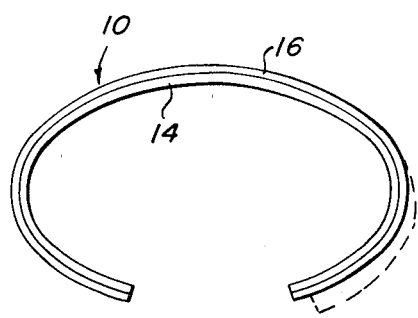
Fig. 2
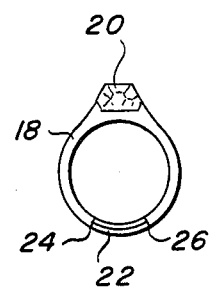
Fig. 3
Fig. 4
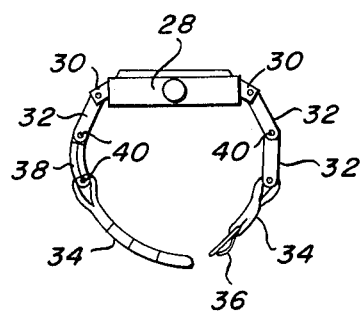
Fig. 5
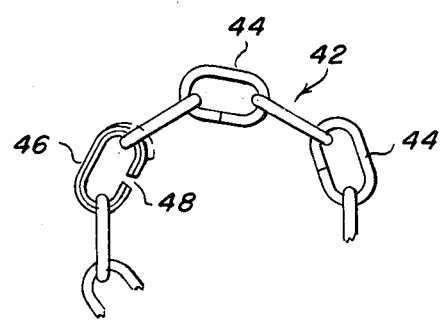
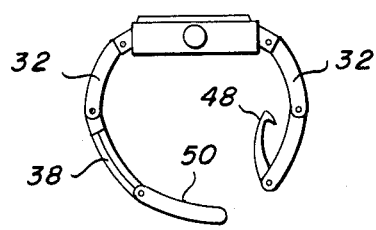
Fig. 6

THERMALLY RESPONSIVE BIMETALLIC JEWELRY

BACKGROUND OF THE INVENTION

This invention relates to jewelry and more particularly to thermally responsive jewelry that expands and contracts in response to ambient temperatures and body heat to aid in the comfort of wearing the jewelry.

The human body to some degree expands and contracts in response to the ambient temperature as for example, wrist and fingers. Consequently, jewelry that fitted correctly and comfortably when bought at a store may not fit correctly or as well in different thermal environments. Thus, during a hot summer day body appendages tend to swell or enlarge for various biological and thermally related reasons and a finger ring or bracelet not so expanding may pinch, become uncomfortable, or even be impossible to remove.

Conversely, during a cold winter day or in sharp, dry wind, exposed portions of the body tend to contract and in like manner jewelry not so responding would fit loosely, slide distractingly around the wrist or finger and may even slip off.

It is well known that metals generally expand and contract in response to temperature changes. Specific metals expand and contract to greater or lesser extent depending on their composition. This principle has been employed in the fabrication of diverse temperature control and thermostat units. Such units commonly employ bimetallic elements whose physical expansion or contractions effect mechanical movement of a pointer or like member indicating the temperature or to actuate heating and air conditioning equipment as by moving switch elements to open or closed positions.

The commonly used bimetallic unit in a thermometer or thermostat consists of a curved composite strip of metal having a relatively high expansion side and a relatively low expansion side. The two sides constitute strips of bonded metal having differing coefficients of thermal expansion. As the temperature rises and falls, the strips tend to curl or unroll in a predictable and uniform fashion.

BRIEF SUMMARY OF THE INVENTION

It is the overall object of this invention to utilize these aspects of bimetallic strips in a unique manner to fabricate jewelry or components thereof that expand and contract with the wearer in response to temperature changes by using the bimetallic strips as inserts or elements to prevent potential pinching of the wearer and slippage or loss of the jewelry resulting from unavoidable relative and often abrupt change in local ambient temperature.

Other objects and features will be apparent from the following description taken with the accompanying drawings.

DESCRIPTION OF THE DRAWINGS

FIG. 1 is a perspective view of an arm having an illustrative bracelet-like article of jewelry thereon;

FIG. 2 is a sectional view of an illustrative thermally responsive bracelet according to the invention;

FIG. 3 is an elevational view of a thermally responsive ring employment a bimetallic insert according to the invention;

FIG. 4 is an elevational view of a thermally responsive composite metal-leather watchband wherein one link is bimetallic in accordance with the invention;

FIG. 5 is an elevational view, partly fragmentary, of a thermally responsive chain wherein one link is made of bimetallic material; and, FIG. 6 is an elevational view of a thermally responsive metal watchband wherein one of the links is bimetallic.

DETAILED DESCRIPTION OF THE INVENTION

This invention is particularly directed to articles of jewelry that surround a body member such as a wrist or finger.

Illustratively in FIG. 1 such an article as a bracelet 10 is shown surrounding the wrist or arm 12. In the form shown, the bracelet comprises a substantially rigid composite metallic member which may be flexed slightly in usual manner to fit about the wrist of the wearer.

While having such luster or adornment to provide requisite enhancement and beauty, such relatively rigid bracelets and the like while fitting comfortably at a given time, may slip readily both fore and aft along the arm as well as circumferentially thereabout when the skin is rather dry and under cool or cold conditions in which the flesh slightly relatively contracts to an extent greater than a bracelet. In like manner, in warm weather or under given conditions of exertion the forearm may expand relative to the bracelet and cause a relative binding of the bracelet on the wrist with lack of comfort.

The composite bracelet 10 of the invention, however, is formed of bimetallic materials defining the usual composite two layer strip seen wherein the inner strip 14 and the outer strip 16 have differing coefficients of expansion. While for given specific utilizations either the outer or the inner strip may have the relatively greater coefficient of expansion, normally it is preferred that the inner strip 14 have this characteristic. Thus, as indicated in phantom lines in FIG. 2, under conditions of relative higher temperature, whereby the wrist of the wearer would tend to enlarge or swell, the bimetallic strips 14 and 16 will also flex by relative expansion of the inner strip 14 to the illustrative position shown in phantom lines in FIG. 2, thereby providing a slightly greater relative radius or area within the bracelet to eliminate or minimize any binding action upon the wrist. The enlargement shown in phantom lines in FIG. 2 is for illustrative purposes only to indicate the nature of the areal expansion within the bracelet and it is evident that the expansion may occur substantially uniformly throughout the length of the bracelet and be relatively quite small at any given point therealong.

In the form of the invention seen in FIG. 3 the same is incorporated into a conventional finger ring having the usual finger encircling portion 18 with a setting or other adornment, engraving, etc. as illustrated generally at 20. In this form of the invention, the annular portion 18 is separated, preferably at a point substantially opposite from any setting or forward ornamentation on the ring and a short length of arcuately curved bimetallic strip material 22 is secured therein as by soldering at its opposite ends 24 and 26 to the member 18. The operation is of course similar wherein the slightly arcuate nature of the bimetallic insert 22 will effect a relative laterally outward expansion under conditions of heat thereby effectively slightly increasing the diameter of the ring so the same will not unduly bear upon a swollen or swelling finger, while under conditions of relative cold, the arc of curvature of the bimetallic insert 22 will decrease as the same relatively contracts, thereby slightly reducing the effective ring diameter so the same will remain comfortable on the finger and not slip loosely therearound, in a manner similar to the action with the wrist-embracing bracelet 10 in FIG. 2.

In FIG. 4 another utilization of the invention as an article of jewelry is contemplated, there shown as a component in a bracelet of a wristwatch. The wristwatch member is shown illustratively at 28 having the usual ears 30 at either side thereof to which bracelet members are secured. The bracelet may include a series of metallic links 32 and flexible leather strap or like portions 34 to which a conventional buckle or clasp 36 is cooperatively associated.

In accordance with the invention, there is incorporated in the wristwatch bracelet a link 38 of arcuately curved bimetallic strip, as between one of the links 32 and a leather strap portion 34. The bimetallic insert may be secured in usual manner by cross-pins 40 secured to ears thereon as is the case with the conventional links 32 and the like as is well known in the art. In like manner it will be seen that upon alteration in ambient temperature which might cause the wrist of the wearer to relatively swell or reduce in size, the arcuate bimetallic insert will likewise flex to a more open or straightened position thereby effectively lengthening the bracelet or under cooler conditions will increasingly curve or become more arcuate and reduce the length of the bracelet to keep the same comfortably upon the wrist of the wearer.

The invention may also be adapted to a multiple link bracelet as in the illustrative showing in FIG. 5. There, a bracelet 42 may be comprised of a series of interconnected links 44 which may be soldered or merely crimped to closed loop configuration in well known form. The links 44 may be of any ornamental or decorative material having a gold or silver or like character. A suitable clasp or latch, not shown, may be provided to readily secure the bracelet around the wrist of the wearer in usual manner.

In accordance with the invention, one of the links as at 46 is comprised of a C-shaped bimetallic strip of the type disclosed and whose ends 48 are in close proximity to preclude ready separation or detachment of the adjacent links therefrom. The ends 48 are slightly spaced to provide a sufficient gap for contraction of the bimetallic link 46 in colder temperatures thereby to again slightly reduce the effective diameter of the bracelet and prevent the same from unduly slipping on the wrist of the wearer. Upon expansion as seen in phantom lines in FIG. 5 somewhat exaggeratedly, the larger diameter of the link will thereby permit the bracelet to have a relatively looser fit upon the wrist of the user and will accommodate any swelling or heat expansion of the body member to some extent.

In FIG. 6, a watch bracelet similar to that in FIG. 4 is shown but wherein the same is comprised entirely of metallic links 32 extending from the watch 28 and with a suitable conventional hinged clasp 48 and cooperating eye 50. As is evident, one of the links in the bracelet will be a bimetallic link 38 whereby the all-metal bracelet will expand and contract as set forth heretofore.

The several embodiments of the invention illustrated are merely typical of applications and utilizations of the invention herein for the purposes described. It is evident that a plurality of such bimetallic links may be employed if desired in a bracelet, watch strap, necklace, finger ring and the like and that the positioning and arrangement thereof may be also varied as desired to provide a particular ornamental effect as well as a predetermined expansion and contraction relationship to the article of jewelry. Thus, the utilization of similar bimetallic inserts as at 38 on opposite sides of a wristwatch will provide a uniformity of appearance thereto as contrasted with the use of merely a single link therein while still achieving the results of the invention.

In like manner, a plurality of such inserts may be provided in spaced relation in a ring of the type seen in FIG. 3, or so comprise a decorative bracelet of the type seen in FIG. 2 when interspersed at spaced intervals between ornamental metal sections. Other variations within the scope of the invention and claims will be evident.

The bimetallic strips shown may be fabricated from any of a number of well known materials commonly employed therefor and it is evident that suitable coloration or markings thereon may be provided as desired in cooperative enhancement with the article of jewelry.

What I claim is:

1. An article of jewelry to be worn upon the human body in substantial encircling relation to a portion thereof comprising a curved length of decorative metallic material configured to embrace a said human body portion, said curved jewelry length having incorporated therein along the length thereof an arcuately curved bimetallic strip, said strip extending in a lengthwise orientation with respect to said jewelry length, said strip including means comprising radially inner and outer metal layers, the metals of said layers having different respective coefficients of expansion thereby to effect relative lengthening or shortening of said jewelry length as said bimetallic strip varies its curvature in response to temperature changes.

2. The article of jewelry of claim 1 wherein said curved length is a generally C-shaped one-piece bracelet, and said bimetallic strip extends substantially the entire length thereof.

3. The article of jewelry of claim 1 wherein said bimetallic strip constitutes a relatively short arcuate length secured medially along said curved length of jewelry.

4. The article of jewelry of claim 3 wherein the same is a finger ring.

5. The article of jewelry of claim 3 wherein the same is a bracelet.

6. The article of jewelry of claim 5 wherein said bracelet is cooperatively associated with a wrist watch.

7. The article of jewelry of claim 5 wherein said bracelet includes a series of pivotally interconnected links.

8. The article of jewelry of claim 7 wherein said bimetallic strip is a C-shaped link looped toward its opposite ends thru adjacent loops of said jewelry length.

9. The article of jewelry of claim 1 wherein a plurality of said bimetallic strips are interspersed along the length of the jewelry.

10. The article of jewelry of claim 1 wherein the bimetallic strip portion having the lesser coefficient of expansion faces generally outwardly of said jewelry article.

* * * * *